United States Patent [19]

Leroy et al.

[11] 4,447,550

[45] May 8, 1984

[54] LEAD ALUMINOBOROFLUOROSILICATE MOLDABLE GLASSES

[75] Inventors: Dominique L. J. Leroy, Montigny Sur Loing; Jean-Pierre Mazeau, Avon, both of France

[73] Assignee: Corning Glass Works, Corning, N.Y.

[21] Appl. No.: 488,960

[22] Filed: Jun. 13, 1983

[30] Foreign Application Priority Data

Sep. 30, 1982 [FR] France .................. 82 16448

[51] Int. Cl.$^3$ .................. C03C 3/08; C03C 3/10
[52] U.S. Cl. .................. 501/75; 501/901; 501/903
[58] Field of Search .................. 501/75, 901, 903

[56] References Cited

U.S. PATENT DOCUMENTS

| | | | |
|---|---|---|---|
| 2,393,448 | 1/1948 | Armistead | 501/75 |
| 2,461,878 | 2/1949 | Christensen et al. | 501/19 |
| 2,642,633 | 6/1953 | Dalton | 501/75 |
| 3,653,933 | 4/1972 | Tsunekawa | 501/75 |
| 3,888,692 | 6/1975 | Kuwayama | 501/75 |
| 4,109,054 | 8/1978 | Burgyan | 501/75 |
| 4,123,731 | 10/1978 | Kanbara et al. | 501/75 |
| 4,146,655 | 3/1979 | Davis et al. | 501/75 |
| 4,285,730 | 8/1981 | Sanford et al. | 501/44 |
| 4,348,484 | 9/1982 | Joormann et al. | 501/44 |
| 4,362,819 | 12/1982 | Olszewski et al. | 501/44 |

Primary Examiner—Mark Bell
Attorney, Agent, or Firm—C. S. Janes, Jr.

[57] ABSTRACT

The instant invention is directed to optical glass compositions capable of being shaped under the combined action of temperature and pressure in a mold so as to obtain articles having surfaces exhibiting highly precise reproduction of the mold walls. The inventive glasses demonstrate softening points not exceeding 500° C., refractive indices between about 1.65–1.82, Abbe number between about 27–39, and consist essentially, in weight percent, of

| | |
|---|---|
| $SiO_2$ | 8–20 |
| $B_2O_3$ | 5–20 |
| PbO | 50–70 |
| $Al_2O_3$ | 1–11 |
| F | 2–7 |

2 Claims, No Drawings

LEAD ALUMINOBOROFLUOROSILICATE MOLDABLE GLASSES

BACKGROUND OF THE INVENTION

A glass is stated to be moldable when it can be changed in shape under the combined action of temperature and pressure in a mold so as to obtain an article whose surface is a highly precise reproduction of the mold wall, thereby permitting the direct production by molding of spherical and aspherical lenses, for example, with no other finishing operation. Until the present time, only glasses with an alkali metal phosphate or fluorophosphate base, such as those described in U.S. Pat. Nos. 4,285,730, 4,348,484, and 4,362,819 could be considered as moldable.

SUMMARY OF THE INVENTION

The glasses comprising the object of the present invention belong to another composition system which permits the obtaining of different optical properties or, in the event that they are comparable, permits a choice as a function of constraints linked to other physical and chemical properties of the glasses as, for example, stability against devitrification, chemical resistance, and coefficient of expansion.

The glasses in question must be capable of molding at a viscosity between approximately $10^8$–$10^{13}$ poises, corresponding to a temperature as low as possible to increase the life of the mold. Therefore, those glasses will be defined by two particular points on the viscosity curve as a function of the temperature:

the Littleton point ($T_L$) which is the temperature at which the viscosity is $10^{7.6}$ poises; and the vitreous transition point ($T_g$) which is the temperature at which the viscosity is on the order of $10^{13}$ poises.

The glasses described below have a $T_L$ and $T_g$ not exceeding 500° C. and 430° C., respectively.

The present invention covers a family of lead aluminoborofluorosilicate optical glasses offering the following valuable advantages:

they can be molded at a temperature below 500° C.;

they have, in spite of their fluorine content, good chemical durability in a moist atmosphere; i.e., comparable to that of certain classic optical glasses such as those having the designations CORNING EO5-25 and C20-36;

they have very good transmission in the visible region of the radiation spectrum due to a high fluorine content; and they are generally very stable in spite of the high fluorine content, which permits casting at high viscosity.

The glasses have an index of refraction ($n_d$) of approximately 1.65–1.82 and an Abbe number ($v_d$) of approximately 27–39 (for the helium d line).

Fluorine is an essential component; primarily to maintain a low softening point when the PbO content is low and/or when the concentrations of $Al_2O_3$ and $SiO_2$ are high. Furthermore, it very significantly improves the transmission of glasses prepared in platinum melting units which is indispensable for applications in the optical field. Accordingly, a minimum content of fluorine is necessary in the glass.

Aside from fluorine and PbO, having known effects upon the index of refraction and the dispersion of the glass on the one hand and upon the viscosity of the glass on the other hand, $Al_2O_3$ is another essential constituent of this system as described below.

The known ternary system $SiO_2$—$B_2O_3$—PbO offers glasses which exhibit a $T_L$ below 450° C. (rendering them interesting in terms of "moldability"). However, they have a very high index of refraction (above about 1.85) and have a lead content exceeding 75% by weight, which leads to glasses with a strong yellow color when prepared in platinum melting units.

As for glasses in this system having a $T_L$ between 450°–500° C., they exhibit either a high content of $B_2O_3$ (which leads to poor resistance to atmospheric corrosion) or a high silica content (which renders them comparable to the classic, so-called "extra-dense" flints wherein alkalies replace $B_2O_3$).

The introduction of fluorine (in a batched quantity on the order of 12% by weight so that the final glass will contain 2–7% thereof) into the above ternary system has the following favorable consequences:

improvement of the coefficient of transmission of the glasses, but without exceeding 60% for a wavelength of 400 nm and a thickness of 10 mm;

reduction of the $T_L$ by 50°–100° C.;

lowering of the index of refraction by $4000$–$6000 \times 10^{-5}$ according to the circumstances, except if the boron content is high, because the volatilization of that element compensates for the effect of the fluorine; and reduction of the melting points by 200°–300° C.

Nevertheless, these glasses exhibit limitations which must be reduced for applications in the field of optics and for industrial manufacturing. In particular, the majority of the glasses in this system ($SiO_2$—$B_2O_3$—PbO—F) exhibits mediocre stability against devitrification or opalization; the most stable glasses have a high level of lead, which has the effect of limiting the transmission of glass and leads to a limited field of optical properties (in general the index is higher than 1.80). Furthermore, whereas they display good resistance to "weathering" or attack by atmospheric agents during long periods of exposure, they are quickly attacked at the beginning of the test.

We have found that the introduction of $Al_2O_3$ makes it possible to improve the stability of the glass toward devitrification and opalization, as well as resistance to "weathering". The improvement in stability permits a significant reduction in PbO content, which has the consequence of enlarging the field of optical properties and increasing the transmission in the visible spectrum.

The following three comparative examples illustrate the stabilizing effect of $Al_2O_3$:

A glass free from $Al_2O_3$ and containing, in weight percent as batched, 11% $SiO_2$, 18% $B_2O_3$, 66% PbO, and 9% F, will crystallize when held in a crucible for one-half hour at 600° C. (a viscosity of about 200 poises).

In contrast, the introduction of 5.4% $Al_2O_3$ (i.e., a substitution on a cationic percent basis of 3% $SiO_2$, 3% $BO_{3/2}$, and 4% PbO by 10% $AlO_{3/2}$) to obtain a composition, in weight percent as batched, of 10.2% $SiO_2$, 17.7% $B_2O_3$, 61.5% PbO, 5.4% $Al_2O_3$, and 9% F, permits the acquisition of remarkable stability: holding the glass at 600° C. (a viscosity of 420 poises) for three hours does not result in the formation of crystals.

Likewise, a composition of 16.4% $SiO_2$, 9.5% $B_2O_3$, 63.1% PbO, 7.5% $Al_2O_3$, and 6% F is not subject to crystallization when held at 650° C. (a viscosity of 340 poises) for three hours.

The latter two compositions, which constitute preferred embodiments of the present invention appear as Examples 10 and 14, respectively, in Table I, infra, which records 15 examples of batched compositions in weight percent according to the present invention. Table I also reports for each example the Littleton point ($T_L$), the vitreous transition temperature ($T_g$), the coefficient of thermal expansion ($\alpha$) over the range of 25°–300° C. expressed in terms of $\times 10^{-7}/°C.$, the refractive index ($n_d$) the Abbe number ($V_d$), the transmission (Trans) of the glass in 10 mm thickness at 400 nm, and, finally, the quality (W) of the "weathering" resistance or resistance to atmospheric corrosion.

The softening point of the glass was determined through the aid of a method developed in the laboratory which yields a temperature 10°–25° C. higher than the conventional Littleton point. This method consists of deforming a disc 32 mm in diameter and 4 mm thick by heating in a furnace at a rate of 60° C./hour. The approximate softening point is read when the glass disc deforms sufficiently to close an air vent placed in the bottom of the support holding the sample being tested. This method is adequate to permit a good selection of so-called "moldable" glasses.

The vitreous transition temperature of the glass was determined from the expansion curve of the glass.

An evaluation of the weathering resistance of the glasses results from a special test of chemical durability which consists in placing polished samples in an enclosure where the air, brought to a temperature of 50° C., demonstrates a relative humidity of 98%. The samples are observed after various exposure times (Table I gives the number of days) either under a beam of intense light or under normal ambient lighting, the observation being made with the unaided eye in transmitted light.

Five classes of quality are defined according to the degree of attack on the sample surfaces:

Class A (excellent)

No pitting and/or haze is visible when viewed in a beam of intense light.

Class B (good)

A few pits and/or slight haze are noticeable under the same viewing conditions as above.

Class C (average)

Many pits and/or substantial haze are noticeable under the same viewing conditions as above.

Class D (mediocre)

Pits and/or haze are observed under normal ambient light.

Class E (poor)

A substantial accumulation of corrosion products is visible under normal ambient light.

In summary, the instant invention covers a general range of chemically analyzed compositions given below; the values within the parentheses representing batched compositions.

| | | |
|---|---|---|
| SiO$_2$ | 8–20 | (8–20) |
| B$_2$O$_3$ | 5–20 | (8–23) |
| PbO | 50–70 | (45–68) |
| Al$_2$O$_3$ | 1–11 | (2–12) |
| F | 2–7 | (2.5–12) |

The amounts of ingredients conforming to the present inventive compositions are derived from the following considerations relative to each of the basic components:

(1) SiO$_2$: 8–20% by weight analyzed (the contents analyzed and batched are very close). A minimum of 8% is required to obtain good resistance to atmospheric corrosion, and a maximum of 20% in order to easily secure a glass without crystals under the conditions of melting defined below.

(2) B$_2$O$_3$: 5–20% by weight analyzed (8–23% batched). A minimum of 5% is necessary for easily obtaining a glass without problems of light diffusion or of opalization, and a maximum of 20% to secure good resistance to atmospheric corrosion.

(3) PbO: 50–70% by weight analyzed (45–68% batched). A minimum of 50% is required to obtain a $T_L$ less than 500° C. and a $T_g$ less than 430° C., and a maximum of 70% in order to maintain satisfactory stability and good transmission at 400 nm as well as good resistance to atmospheric corrosion.

(4) Al$_2$O$_3$: 1–11% by weight analyzed (2–12% batched). A minimum of 1% is necessary for improved resistance to atmospheric corrosion when compared with Al$_2$O$_3$-free glass, and preferably at least 4% in order to manifest a definite effect upon the stability of the glass, and a maximum of 11% to obtain a glass which does not diffuse light.

(5) F: 2–7% by weight analyzed (2.5–12% batched). A minimum of 2% is required to have a $T_L$ below 500° C., a $T_g$ below 430° C., and a transmission greater than 60% at 400 nm. Where more than 12% F is batched, the fluorine retention (quantity analyzed/quantity batched) becomes very low which leads, on the one hand, to a very slight supplemental modification in glass properties and, on the other hand, to difficulties in melting the glasses (notably pollution).

It is worthy of note that the weight percentages batched which are given are such that if S designates the sum of the oxides and X the weight percent of fluorine, the sum S+X is greater than 100 since in the glass a part of the oxygen in the oxides is replaced by fluorine. S and X satisfy the equation:

$$S+X=100+0.421X$$

where (0.421X) is the weight of oxygen corresponding to X% of fluorine.

This is the reason that, for a glass of a given cationic composition, the batched composition in weight percent relative to the oxides, depends upon the fluorine content, as is illustrated by a comparison of Examples 9 to 12 of Table I, which do not differ essentially except in fluorine content.

Within the above general ranges of operable compositions, the preferred glasses are recited below as analyzed in weight percent. The batched composition ranges are recorded in parentheses.

| | | |
|---|---|---|
| SiO$_2$ | 8–18 | (8–18) |
| B$_2$O$_3$ | 5–17 | (8–20) |
| PbO | 60–70 | (55–68) |
| Al$_2$O$_3$ | 4–8 | (4.5–9) |
| F | 4–7 | (4.5–12) |

Those limited ranges comprise a set of particularly useful glasses having the characteristics:

a $T_L$ below 470° C.;
a $T_g$ below 420° C.;

a coefficient of transmission greater than 70% for a thickness of 10 mm and at a wavelength of 400 nm;

excellent resistance to corrosion in a humid atmosphere; and remarkable stability.

The glasses belonging to the preferred ranges appear in Table I as Examples 1, 5, 6, 9, 10, 11, 13, and 14. Among them, Examples 10 and 14 exhibit the most advantageous properties; Example 14 being preferred since it demonstrates a $T_L$ and a $T_g$ lower than those of Example 10, greater transmission, higher retention of fluorine due to a lower $B_2O_3$ content, while the stability and resistance to atmospheric corrosion remain comparable.

Table II reports analyses of Examples 10 and 14 in comparison with the amounts batched.

Table III records analyses of Examples 9–15 utilizing X-ray fluorescence.

Certain oxides may optionally be introduced into the glasses. For example, it is possible to introduce 5% by weight $TiO_2$ in order to obtain particular physical properties (coefficient of expansion, optical properties, etc.). Likewise, it is possible to introduce up to 12% by weight of ZnO or $Sb_2O_3$ for the same reason.

PRIOR ART

U.S. Pat. No. 2,393,448 discloses glasses having softening points as low as 500° C. which consist essentially, in weight percent, of 10–50% $SiO_2$, 5–65% $B_2O_3$, 20–40% PbO, 5–15% $Al_2O_3$, and a small amount F, noting the utility of 10% $PbF_2$. The PbO content is lower than demanded in present inventive glasses.

U.S. Pat. No. 2,461,878 discusses glasses consisting essentially, in weight percent, of 1–16% $SiO_2$, 6.1–11.4% $B_2O_3$, 72.6–87.5% PbO, and small amount F, noting the utility of 5% $PbF_2$. $Al_2O_3$ is nowhere mentioned and the PbO content is too high.

U.S. Pat. No. 2,642,633 is concerned with soft, preferably alkali metal-free glasses consisting essentially, in weight percent, of 0–20% $SiO_2$, 0–40% $B_2O_3$, 60–85% PbO, 5–15% $Al_2O_3$, and a small amount F, noting the utility of 28% $PbF_2$. There is no teaching of the criticality of having a quinary system, viz., compositions within the $PbO$—$Al_2O_3$—$B_2O_3$—$SiO_2$—F field, and that each component must reside within a restricted range of values.

U.S. Pat. No. 4,109,054 describes soft sealing glasses consisting essentially, in weight percent, of 2–8% $SiO_2$, 0–6% $B_2O_3$, 75–90% PbO, and 0–10% F. The PbO level is too high, $B_2O_3$ and F are optional, not mandatory ingredients, and $Al_2O_3$ is not part of the composition.

U.S. Pat. No. 4,123,731 refers to low melting glasses consisting essentially, in weight percent, of 27–42% $SiO_2$, 0–9% $B_2O_3$ 52–71% PbO, 0–5% $Al_2O_3$, and 1–10% F, noting the utility of PbF, $BaF_2$, $KHF_2$, $Na_2SiF_6$. The $SiO_2$ content is too high and both $Al_2O_3$ and $B_2O_3$ are merely optional components.

U.S. Pat. Nos. 4,285,730, 4,348,484, and 4,362,819 are directed to glass compositions suitable for molding, having low softening and transition points, but the glasses of each contain substantial proportions of alkali metal oxides.

DESCRIPTION OF PREFERRED EMBODIMENTS

Table I recites a group of glasses, expressed in terms of weight percent on the oxide basis as calculated from the batch, illustrating compositions exhibiting the desired chemical and physical properties. The actual batch ingredients may be any materials, either the oxides or other compounds, which, when melted together will be converted into the desired oxide in the proper proportions. Because it is not known with which cation(s) the fluorine is combined, it is simply reported in terms of F, in accordance with common glass analysis practice. The oxygen≡fluorine correction factor has been inserted to reflect the explanation above regarding the replacement of a portion of the oxygen by fluorine.

The batches were compounded, mixed together thoroughly, charged into platinum crucibles having a capacity of one liter, and melted at temperatures between 850°–1100° C., usually at 900° C. (Glasses having the same composition in oxides but lacking fluorine would have required melting temperatures between 1100°–1300° C.) The melts were poured slowly while at a viscosity between 20–200 poises to form bars which were cooled in a controlled manner in order to obtain optical quality.

With regard to the ingredients used:

$SiO_2$ and $B_2O_3$ were introduced in the form of quartz and boric anhydride, respectively;

PbO is introduced in the form of $PbF_2$ or $Pb_3O_4$, depending upon the fluorine content required;

$Al_2O_3$ is introduced in the form of the pure oxide or $AlF_3$, if melting of the $Al_2O_3$ raises problems for certain compositions high in $Al_2O_3$; and the fluorine is preferably introduced in the form of $PbF_2$ so as to obtain a glass exhibiting no haze. (If the use of $AlF_3$ is necessary, the weight of fluorine contributed by that compound ought not to exceed 50% of the total weight of fluorine batched in order to obtain a glass of optical quality.)

It will be appreciated that the above description of compositions and processing procedure is merely exemplary and can be altered, particularly by substitution of technical equivalents, without departing from the scope of the invention.

TABLE I

|  | 1 | 2 | 3 | 4 | 5 |
|---|---|---|---|---|---|
| $SiO_2$ | 9.5 | 9.7 | 16.2 | 13.1 | 9.6 |
| $B_2O_3$ | 8.5 | 13.1 | 21.5 | 9.2 | 11.1 |
| PbO | 66.5 | 67.9 | 45.9 | 61.4 | 67.2 |
| $Al_2O_3$ | 8.9 | 2.7 | 9.8 | 9.7 | 5.4 |
| F | 11.4 | 11.4 | 11.4 | 11.4 | 11.4 |
| O≡F | −4.8 | −4.8 | −4.8 | −4.8 | −4.8 |
| $T_L$ (°C.) | 423 | 403 | 500 | 448 | 414 |
| $T_g$ (°C.) | 367 | 356 | 430 | 400 | 356 |
| α | 107 | 87 | 67 | 87 | 100 |
| $n_d$ | 1.7277 | 1.8202 | 1.6536 | 1.7022 | 1.7743 |
| $V_d$ | 32.6 | 27.9 | 38.5 | 34.3 | 30.4 |
| W (days) | B after 7 | B after 3 | C after 3 | B after 3 | B after 2 |
|  | C after 15 | C after 10 | C after 41 | C after 10 | C after 6 |
|  | C after 44 | D after 41 | — | — | D after 41 |

|  | 6 | 7 | 8 | 9 | 10 |
|---|---|---|---|---|---|
| $SiO_2$ | 11.7 | 17.4 | 18.1 | 10.0 | 10.2 |
| $B_2O_3$ | 18.1 | 10.1 | 8.1 | 17.4 | 17.7 |
| PbO | 58.0 | 55.4 | 65.4 | 60.6 | 61.5 |
| $Al_2O_3$ | 5.5 | 10.5 | 1.8 | 5.3 | 5.4 |
| F | 11.4 | 11.4 | 11.4 | 11.4 | 9.0 |
| O≡F | −4.8 | −4.8 | −4.8 | −4.8 | −3.8 |
| $T_L$ (°C.) | 458 | 476 | 417 | 447 | 460 |
| $T_g$ (°C.) | 395 | 420 | 355 | 380 | 402 |

TABLE I-continued

|   | | | | | |
|---|---|---|---|---|---|
| α | 81 | — | 99 | 94 | 79 |
| $n_d$ | 1.7276 | 1.6790 | 1.7743 | 1.736 | 1.7312 |
| $V_d$ | 33.3 | 35.9 | 29.4 | — | 33.4 |
| W (days) | B after 2<br>C after 13<br>D after 41 | — | B after 2<br>C after 3<br>D after 34 | —<br>—<br>— | B after 3<br>C after 10<br>— |
| Trans. | — | — | — | 72% | 70% |

|  | 11 | 12 | 13 | 14 | 15 |
|---|---|---|---|---|---|
| $SiO_2$ | 10.4 | 10.6 | 16.1 | 16.4 | 16.7 |
| $B_2O_3$ | 18.0 | 18.4 | 9.3 | 9.5 | 9.7 |
| PbO | 62.6 | 63.7 | 62.0 | 63.1 | 64.3 |
| $Al_2O_3$ | 5.5 | 5.6 | 7.3 | 7.5 | 7.6 |
| F | 6.0 | 3.0 | 9.0 | 6.0 | 3.0 |
| O≡F | −2.5 | −2.5 | −3.8 | −2.5 | −1.3 |
| $T_L$ (°C.) | 456 | 472 | 443 | 445 | 473 |
| $T_g$ (°C.) | 405 | 415 | 335 | 395 | 408 |
| α | 82 | 66 | 86 | 80 | 70 |
| $n_d$ | 1.7263 | 1.7427 | 1.7097 | 1.7135 | 1.7369 |
| $V_d$ | 33.8 | 32.6 | 32.4 | 33.8 | 30.3 |
| W (days) | B after 3<br>C after 10 | B/C after 3<br>— | B after 3<br>C after 10 | B after 3<br>C after 10 | B after 3<br>C after 10 |
| Trans. | 69% | 70% | 77% | 76% | 71% |

TABLE II

| Example 10 | Batched | Analyzed |
|---|---|---|
| $SiO_2$ | 10.2 | 10.5 |
| $B_2O_3$ | 17.7 | 15.5 |
| PbO | 61.5 | 65.5 |
| $Al_2O_3$ | 5.4 | 5.0 |
| F | 9.0 | 5.2 |
| O≡F | −3.8 | −2.2 |

| Example 14 | Batched | Analyzed |
|---|---|---|
| $SiO_2$ | 16.4 | 16.1 |
| $B_2O_3$ | 9.5 | 9.4 |
| PbO | 63.1 | 63.1 |
| $Al_2O_3$ | 7.5 | 8.2 |
| F | 6.0 | 5.0 |
| O≡F | −2.5 | −2.1 |

Means of analysis:
$SiO_2$ and $B_2O_3$ by plasma emission with 3 electrodes
$Al_2O_3$ by atomic absorption
PbO by electrogravimetry
Fluorine by pyrohydrolysis and colorimetry

TABLE III

| Example | $SiO_2$ Batched | Analyzed | $B_2O_3$ Batched | Analyzed | PbO Batched | Analyzed |
|---|---|---|---|---|---|---|
| 9 | 10.0 | 10.3 | 17.4 | — | 60.6 | 65.8 |
| 10 | 10.2 | 10.5 | 17.7 | 15.5 | 61.5 | 65.5 |
| 11 | 10.4 | 11.1 | 18.0 | — | 62.6 | 65.0 |
| 12 | 10.6 | 11.3 | 18.4 | — | 63.7 | 64.9 |
| 13 | 16.1 | 15.3 | 9.3 | — | 62.0 | 62.9 |
| 14 | 16.4 | 16.1 | 9.5 | 9.4 | 63.1 | 63.1 |
| 15 | 16.7 | 16.0 | 9.7 | — | 64.3 | 63.2 |

| Example | $Al_2O_3$ Batched | Analyzed | F Batched | Analyzed | O≡F Batched | Analyzed |
|---|---|---|---|---|---|---|
| 9 | 5.3 | 5.2 | 11.4 | 5.5 | −4.8 | — |
| 10 | 5.4 | 5.0 | 9 | 5.2 | −3.8 | −2.2 |
| 11 | 5.5 | 5.0 | 6 | 4.6 | −2.5 | — |
| 12 | 5.6 | 5.2 | 3 | 2.5 | −1.3 | — |
| 13 | 7.3 | 7.8 | 9 | 6.0 | −3.8 | — |
| 14 | 7.5 | 8.2 | 6 | 5.0 | −2.5 | −2.1 |
| 15 | 7.6 | 8.4 | 3 | 2.5 | −1.3 | — |

Glasses 10 and 14 were analyzed completely as in Table II.

Glasses 9, 11, and 12 were analyzed by X-ray fluorescence utilizing Example 10 as reference.

Glasses 13 and 15 were analyzed in like manner with Example 14 as reference.

We claim:

1. A moldable optical glass of the lead aluminoborofluorosilicate type having an index of refraction between about 1.65–1.82, an Abbe number between about 27–39, a softening point not exceeding 500° C., good chemical durability in a moist atmosphere, and high stability which consists essentially, expressed in terms of weight percent on the oxide basis, of

| | |
|---|---|
| $SiO_2$ | 8–20 |
| $B_2O_3$ | 5–20 |
| PbO | 50–70 |
| $Al_2O_3$ | 1–11 |
| F | 2–7 |

2. A glass according to claim 1 consisting essentially of

| | |
|---|---|
| $SiO_2$ | 8–18 |
| $B_2O_3$ | 5–17 |
| PbO | 60–70 |
| $Al_2O_3$ | 4–8 |
| F | 4–7 |

* * * * *